United States Patent [19]

Hunt

[11] Patent Number: 5,217,333

[45] Date of Patent: Jun. 8, 1993

[54] ADJUSTABLE REAMER

[75] Inventor: Carl E. Hunt, Davisburg, Mich.

[73] Assignee: Valenite Inc., Troy, Mich.

[21] Appl. No.: 754,336

[22] Filed: Sep. 4, 1991

Related U.S. Application Data

[63] Continuation of Ser. No. 522,335, May 11, 1990, abandoned.

[51] Int. Cl.⁵ .............................................. B23B 27/16
[52] U.S. Cl. .................................... 408/181; 408/185; 408/199
[58] Field of Search ............... 408/199, 231, 233, 713, 408/239, 181, 185, 153, 161, 162, 197, 198; 407/107, 111

[56] References Cited

U.S. PATENT DOCUMENTS 4,353,669 10/1982 Striegl .............................. 408/185

Primary Examiner—Daniel W. Howell
Attorney, Agent, or Firm—Bill C. Panagos

[57] ABSTRACT

A reamer having a single cutting blade with parallel clamping and seating surfaces seated in an anvil having converging radially outward extending planar surfaces for enhancing the clamping effectiveness of an installed anvil/cutting blade adjustably positioned radially by a pair of set screws angled to provide fine adjustment.

2 Claims, 2 Drawing Sheets

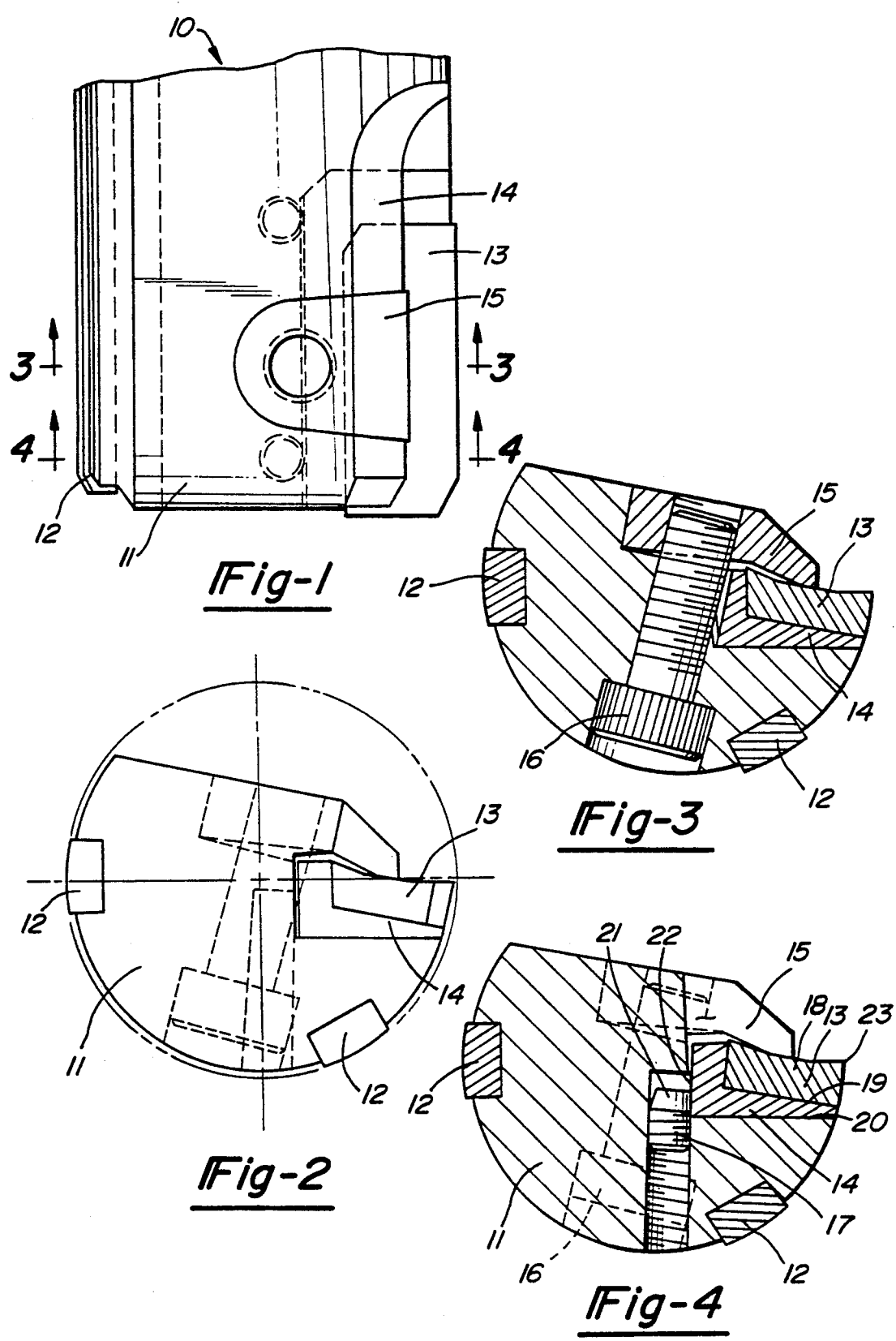

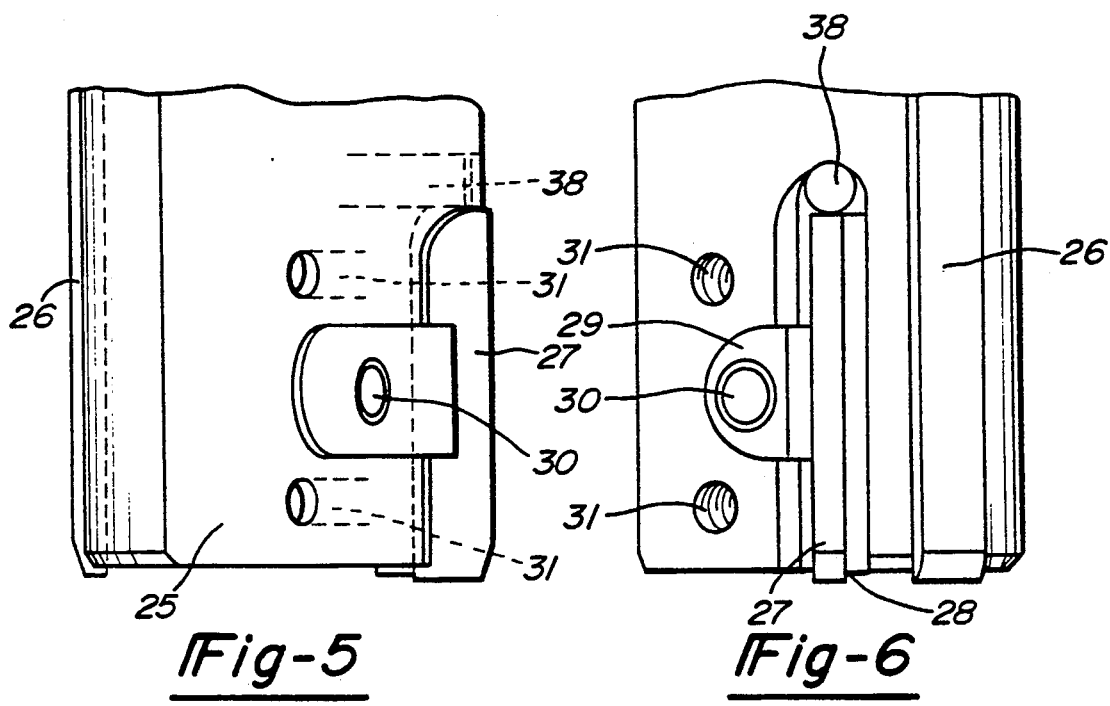
Fig-5  Fig-6
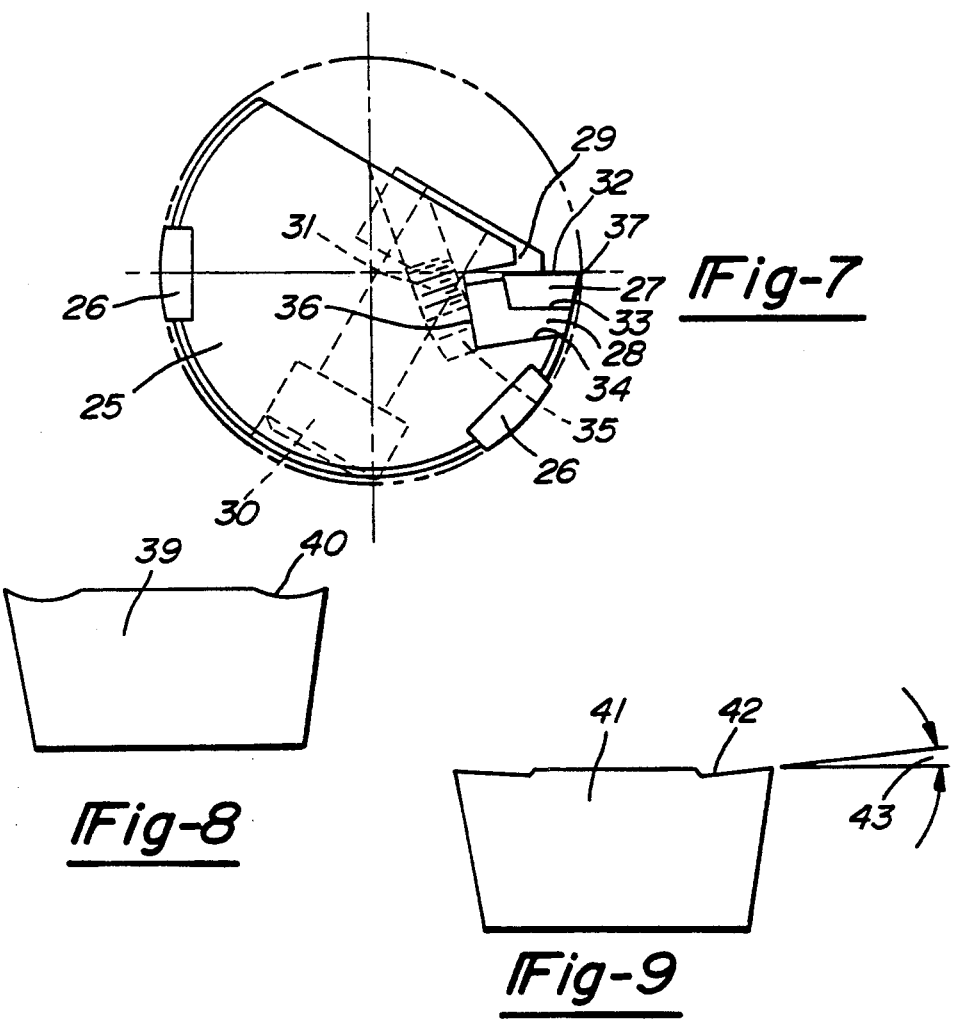
Fig-7
Fig-8
Fig-9

ADJUSTABLE REAMER

This is a continuation of copending application Ser. No. 07/552,335 filed on May 11, 1990 now abandoned.

BACKGROUND OF THE INVENTION

U.S. Pat. No. 4,125,342 discloses a rotating cutting head of a reamer formed with a recess open in a radially outward direction and one circumferential direction relative to the axis of rotation, and a reaming blade retained in the recess between opposite radially extending faces of the head and of a clamping shoe that may be adjusted inward of the recess. Two faces portions of the blade are engaged by the respective faces of the head and shoe in area contact in planes which converge in a radially outward direction at a small acute angle to prevent movement of the blade from an initial radially adjusted position under cutting stress. A differential screw engaging the reamer head and the clamping shoe is employed to retain the insert in the cutter head.

BRIEF DESCRIPTION OF THE PRESENT INVENTION

An anvil is provided with radially outward converging surfaces for seating an insert in a recess in the cutter head in order to enhance clamping effectiveness on parallel surfaces of the insert while seated in a corner pocket of the anvil. A clamp element engaging one of such parallel surfaces at the center of the cutting face of the insert is held with a clamp element by socket head screw extending through the cutter head. A pair of fine pitch set screws having slightly tapered conical ends engage the back of the anvil to provide a very fine radial adjustment for the anvil and cutting edge of the insert seated thereon while clamping pressure is applied.

BRIEF DESCRIPTION OF THE DRAWINGS

FIG. 1 is a plan view of the end of a reamer equipped with the insert cutter mounting of the present invention;

FIG. 2 is an end view of the reamer illustrated in FIG. 1;

FIG. 3 is a sectional view taken along the lines 3—3 of FIG. 1;

FIG. 4 is a sectional view taken along the line 4—4 of FIG. 1;

FIG. 5 is a view similar to FIG. 1 illustrating a preferred modified embodiment of the invention;

FIG. 6 is a fragmentary side elevation of the reamer shown in FIG. 5;

FIG. 7 is an end view of the reamer shown in FIG. 5;

FIG. 8 is an end view of a typical aluminum cutting insert; and

FIG. 9 is an end view of a typical steel cutting insert.

DETAILED DESCRIPTION OF FIRST EMBODIMENT

With reference to the first embodiment illustrated in FIGS. 1-4, reamer 10 having cutting head 11 is provided with longitudinal guide shoes 12, insert blade 13 seated in a corner pocket of anvil 14 held by clamp 15 secured by socket head cap screw 16 with anvil 14 adjustably positioned by a pair of set screws 17. Clamp 15 engages median surface 18 of cutter blade 13 which is parallel to seating surface 19 of anvil 14 and slightly oblique to seating surface 20 of reamer head 11.

Conical ends 21 of set screw 17 engage anvil side 22 to provide a fine radial adjustment for cutting edge 23 while full clamping pressure is applied. The anvil protects the insert from chipping which may occur in cases where adjustment screws engage the side of an insert directly in the absence of an anvil. A backward inward clearance taper of approximately 0.0003 inch per inch is normally provided.

DETAILED DESCRIPTION OF PREFERRED EMBODIMENT

With reference to FIGS. 5-7, the preferred embodiment includes reamer head 25, guide shoes 26, cutter blade 27 seated on anvil 28, clamp 29 secured by cap screw 30 with anvil 28 adjustably positioned by set screws 31 located on either side of clamp 29. Top face 32 of cutter blade 27 is clamped against parallel face 33 of anvil 28 extending in oblique relation to seating surface 34 and head 25. Conical surface 35 of set screws 31 engage back surface 36 of anvil 28 to provide fine adjustment of cutting edge 37. Pin 38 seated in reamer head 25 locates both insert and anvil longitudinally in the reamer head.

With reference to FIGS. 8 and 9 illustrating enlarged views of typical insert blades, aluminum cutting insert 39 is provided with radiused groove 40, while steel cutting insert 41 is provided with tapered flats 42 preferably at a positive angle 43 of approximately 6°.

I claim:

1. An adjustable reamer, comprising:
   a rotatable body having a head, said head provided with bore contacting guide shoes;
   cutter insert blade having at least one positive cutting edge and characterized by an anvil providing a shoulder seat for said insert, said anvil having radially outward converging tapered seating surfaces engaging respectively planar surfaces of said head and insert, said anvil and insert extend longitudinally parallel to the axis of the body and wherein a radial pin is located in said head to provide longitudinal location for both insert and anvil;
   a clamp actuated by a threaded socket head cap screw; and
   a pair of adjustment screws in said head engaging said anvil to provide radial adjustment of said anvil seated insert, said screws extending at a slight acute angle relative to the engaged surface of said anvil in order to provide fine adjustment, whereby the wedging relation between said clamp and said seating surface for said anvil relative to the interposed surfaces of said anvil seated insert enhances the clamping effectiveness against radially outward displacement of said anvil seated insert.

2. Adjustable reamer of claim 1 wherein said insert is provided with a pair of reversible positive cutting edges relative to said clamp engaging surface.

* * * * *